United States Patent
Simpson (10) Patent No.: US 7,460,262 B2
(45) Date of Patent: Dec. 2, 2008

(54) ALTERING WEB SERVICE ACCESS THROUGH A REPLACEABLE COMPONENT

(75) Inventor: Shell S. Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 941 days.

(21) Appl. No.: 10/951,668

(22) Filed: Sep. 28, 2004

(65) Prior Publication Data

US 2006/0072145 A1    Apr. 6, 2006

(51) Int. Cl.
*G06F 3/12* (2006.01)
*G06K 15/02* (2006.01)

(52) U.S. Cl. .................. 358/1.15; 358/1.16; 399/8; 399/12; 399/24

(58) Field of Classification Search ............... 358/1.15, 358/1.14, 1.13, 1.16, 406; 399/262, 12, 24, 399/27, 8, 25, 110, 111, 119; 347/7, 19; 709/223, 224; 707/104.1
See application file for complete search history.

(56) References Cited

U.S. PATENT DOCUMENTS

| | | | |
|---|---|---|---|
| 6,625,402 B2 * | 9/2003 | Takemoto | 399/8 |
| 2002/0022990 A1 * | 2/2002 | Kurata et al. | 705/14 |
| 2003/0016382 A1 * | 1/2003 | Schneider et al. | 358/1.15 |
| 2003/0046334 A1 | 3/2003 | Simpson | |
| 2003/0063913 A1 | 4/2003 | Yamazaki | |
| 2003/0084114 A1 | 5/2003 | Simpson et al. | |
| 2003/0112460 A1 | 6/2003 | Simpson et al. | |
| 2003/0115247 A1 | 6/2003 | Simpson et al. | |
| 2003/0120768 A1 | 6/2003 | Simpson | |
| 2003/0172148 A1 | 9/2003 | Simpson et al. | |
| 2003/0225894 A1 | 12/2003 | Ito | |

* cited by examiner

*Primary Examiner*—Kimberly A Williams (57) ABSTRACT

A method for altering web service access through a replaceable component comprising the steps of: inserting a replaceable component into a printing device; and reading the replaceable component to determine if the component includes a setting that is used to alter web service access.

82 Claims, 10 Drawing Sheets

PRINT CARTRIDGE MEMORY 208

CARTRIDGE CREDENTIAL 301

RANDOM NUMBER 304

CARTRIDGE SERIAL NUMBER 306

| | CARTRIDGE SERIAL NUMBER | PRINTING DEVICE SERIAL NUMBER |
|---|---|---|
| 1 | 12456 | 45h567 |
| 2 | 12456 | 345h67 |
| 3 | 12456 | 234567 |
| 4 | 12456 | 6434547 |
| 5 | 12456 | 9823467 |

ALTERING WEB SERVICE ACCESS THROUGH A REPLACEABLE COMPONENT

BACKGROUND OF THE INVENTION

Many types of printing devices are equipped with replaceable components each having a life cycle during which the replaceable component is functional. At the end of the life cycle of a replaceable component, the component is often replaced for the printing device to continue to function properly.

For example, a print cartridge is installed in many types of printing devices to provide a supply of print material (e.g., toner or ink) for the printing process. As documents are printed, the print material is gradually depleted. When the supply of print material is exhausted, the print cartridge is typically replaced.

A user who wishes to obtain a replacement component, such as a print cartridge, for a printing device may purchase the component from a supplier. New and innovative ways are needed to enable the supplier to add value to these components for their customers.

One of these opportunities would be presented if a web service could be offered to the user when the replacement component was replaced. In this manner, when the replacement component is installed in the printing device, the web service access could be enabled or disabled using data stored on the replacement component.

It is apparent from the above that there exists a need in the art of printing devices for a replacement component that can be installed in a printing device, but which at the same time is capable of enabling/disabling access to a web service through data stored on the replacement component.

The above and other features of the present invention, which will become more apparent as the description proceeds, are best understood by considering the following detailed description in conjunction with the accompanying drawings, wherein like characters represent like parts throughout the several views and in which:

DETAILED DESCRIPTION OF THE INVENTION

The present invention hereby incorporates, entirely by reference, U.S. patent application Ser. No. 10/903,157, filed on Jul. 30, 2004.

As used herein, the phrase "network service" refers is one or more functions that can be performed by a server system at the request of a client device. As is well known in the art, many client/server systems follow a "remote procedure call" (RPC) protocol to allow a client to remotely invoke a network service that is provided by a server system. The Simple Object Access Protocol (SOAP) is one example of a RPC protocol. Other RPC protocols are provided by the "Common Object Request Broker Architecture" (CORBA), the "Distributed Computing Environment" remote procedure call (DCE-RPC), MS-RPC, XML-RPC, the "Distributed Component Object Model" (DCOM), and the Remote Method Invocation (RMI) protocol.

As used herein, the word "credential" refers to data that is sent by a client to a server in order to demonstrate to the server that the client is entitled and/or authorized to access an aspect of a network service provided by the server. The following provides a non-limiting list of credential types that are presently used in the art:

Example credential type #1: A randomly generated number that is known to both the client and the server (i.e. a shared secret).

Example credential type #2: A large number (e.g., a number that requires more than 2000 bits to represent) that that is known to both the client and the server.

Example credential type #3: A pair of numbers. The first number is an encrypted version of the second number. The server can use a shared secret (e.g., a private cryptographic key) to decrypt the first number and then determines if the first number matches the second number in order to verify the credential.

Example credential type #4: A client identifier (e.g., a serial number) encrypted with a shared secret (e.g., a private cryptographic key) that is known to both the client and the server. The shared secret is not passed between the client and the server.

Figure 1:
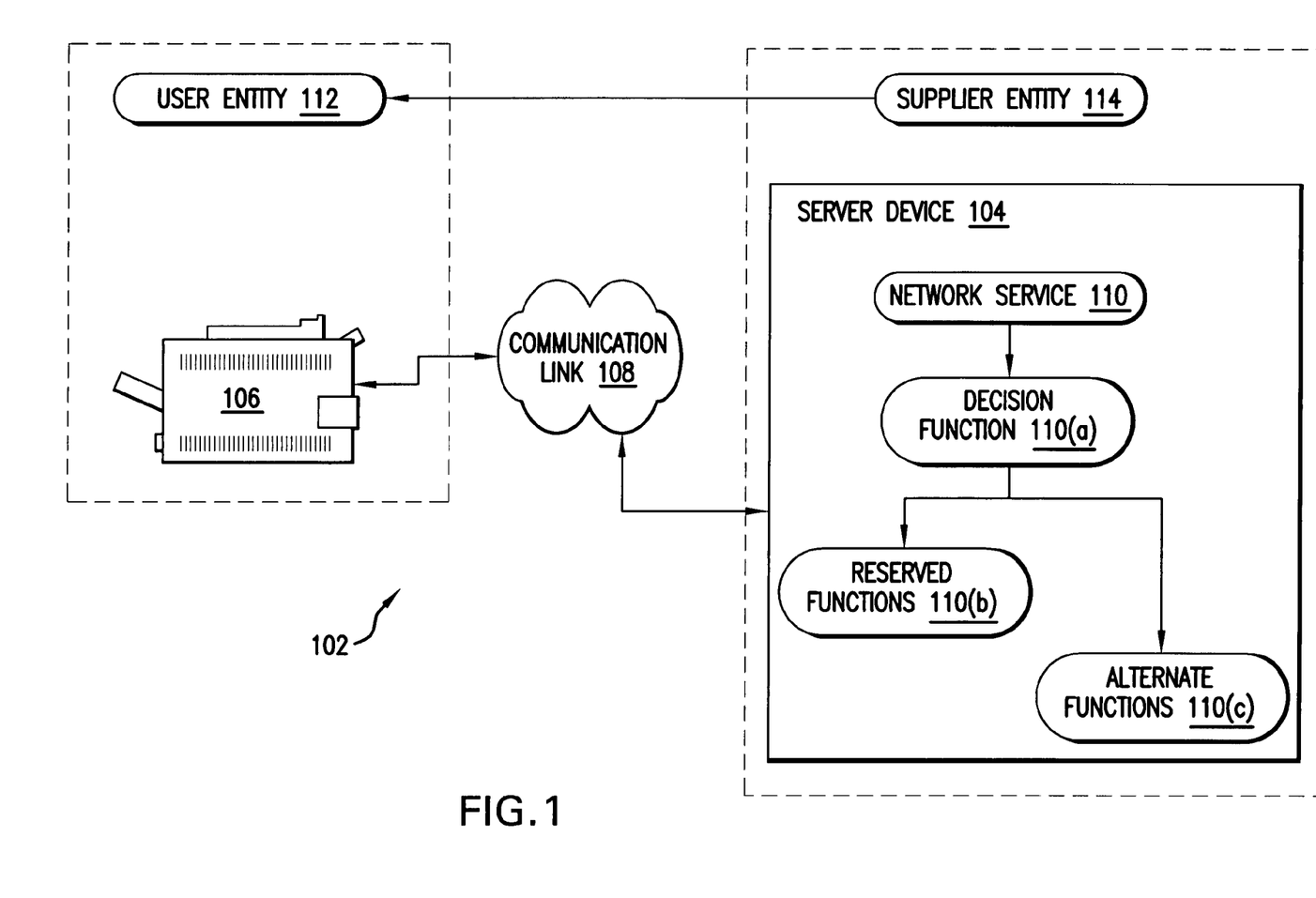
FIG. 1 is a high level block diagram of a computing system, according to an embodiment of the present invention.

With reference first to FIG. 1, there is illustrated a high level block diagram of a computing system 102 that is in accordance with one example embodiment of the invention. As shown, the computing system 102 includes a server system 104 and a printing device 106. Each of these devices is able to communicate over a communication link 108. The communication link 108 may represent the Public Internet, for example.

It is noted for the later discussion that the computing system 102 may include other printing devices that can also communicate with the server system 104 over the communication link 108. This may be especially true in implementations wherein the communication link 108 is the public Internet.

The printing device 106, in this illustrative embodiment, is a laser printer of a type that uses a replaceable print cartridge that includes toner. From time to time, the print cartridge may need to be replaced and is typically replaced in the field.

For the discussion that follows, we will assume that there exists a user entity 112 and a supplier entity 114. The user entity 112 may represent a business or an individual that owns and operates the printing device 106. The supplier entity 114 may represent an enterprise that both maintains the server system 104 and supplies replacement printing device components to its customers. The user entity 112, for example, may purchase replacement print cartridges from the supplier entity 114 for use in the printing device 106.

We will further assume that the supplier entity 114 provides a type of print cartridge (illustrated in FIG. 2) that includes a memory for storing electronic data. As is discussed further below, prior to this type of print cartridge being provided to a user, the supplier entity 114 issues a "cartridge credential" to the print cartridge and stores this data in the memory of the print cartridge. For ease of discussion, we will refer to a print cartridge that has been issued a cartridge credential by the supplier entity 114 as an "authorized print cartridge".

A print cartridge that has not been issued a cartridge credential by the supplier entity 114 may be referred to as an "unauthorized print cartridge". This is true even if the print cartridge is an exact replica of an authorized print cartridge.

In the next part of the discussion, we will assume that, from the supplier's perspective, there are two mutually exclusive categories of client devices that are able to communicate with the server system 104. A client device that falls into the first category we will refer to herein as an "authorized client device". An authorized printing device refers to any printing device that has presently installed an authorized print cartridge.

A client device that falls into the second category we will refer to herein as an "unauthorized printing device". An unauthorized client device refers to any client device that does not qualify as an authorized printing device. Thus, for example, a printing device that can interact with the server system 104 as a client, but does not have presently installed an authorized print cartridge, is considered an "unauthorized client device As indicated in FIG. 1, the server system 104 provides a network service 110. A client device can invoke the network service 110 by transmitting a RPC message that adheres to certain policies to the server system 110. In the present embodiment, the RPC message may be transmitted to the server system 104 using an HTTP protocol and the RPC message may be in accordance with a version of SOAP. In other embodiments, however, other protocols may be used, such as those provided by CORBA, DCE-RPC, MS-RPC, XML-RPC, DCOM, RMI, etc.

In this embodiment, the network service 110 includes a "decision function" 110(a), a reserved set of functions 110(b), and an alternate set of functions 110(c). Generally speaking, when a RPC message is received to invoke the network service 110, the server system 110 initially performs the decision function 110(a) to determine if the information included in the RPC message demonstrates, to an acceptable level of certainty, that the originator of the message is an authorized printing device.

If the server system 104 concludes that the originator of the RPC message is an authorized printing device, the reserved set of functions 110(b) is invoked in response to the RPC message. Otherwise, the alternate set of functions 110(c) is invoked. In this manner, the server system 110(b) attempts to limit access to the reserved set of functions 110(b) to authorized printing devices. This is in accordance with the intent of the supplier entity 114 who wishes to limit access to the alternate set of functions 110(b) to supplier's customers.

In the present embodiment, an authorized printing device can demonstrate to the server device 104 that it is indeed an authorized printing device by transmitting to the server system 104 an RPC message that specifies certain information. In this example, this information includes:
 1. The serial number of the printing device; and
 2. The cartridge credential.

Construction of an Authorized Print Cartridge

Figure 2:
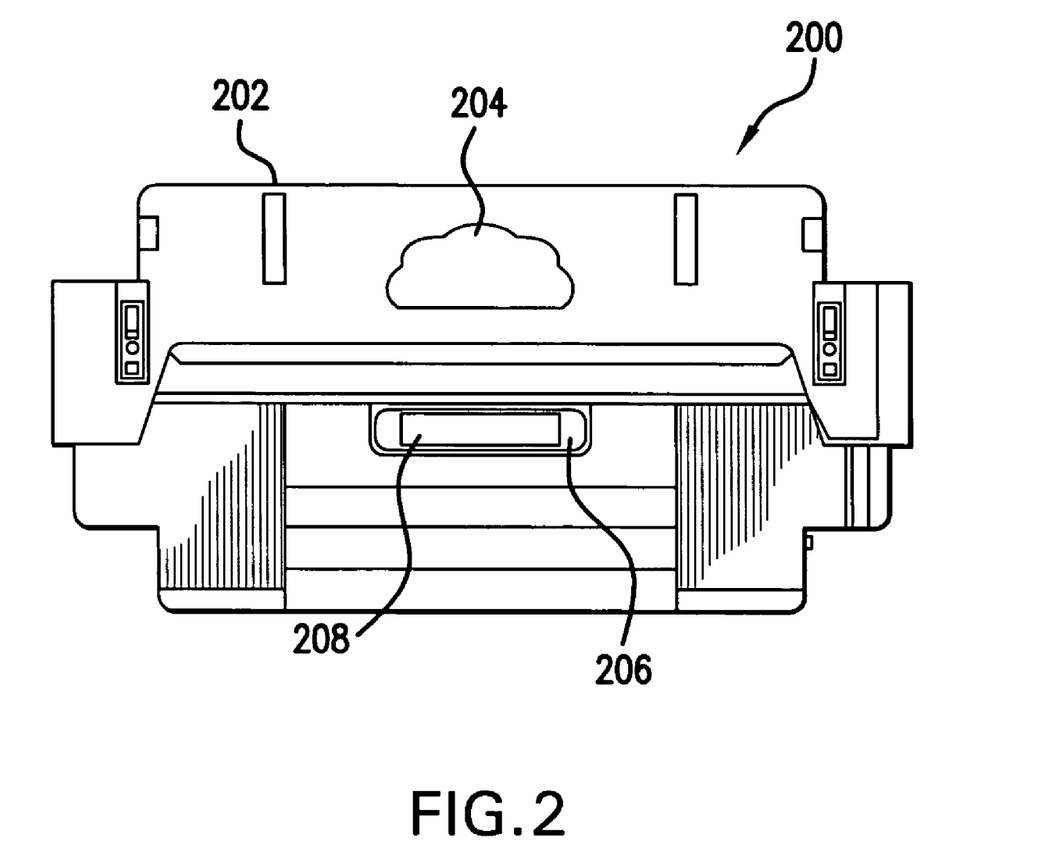
FIG. 2 illustrates an example of a print cartridge that includes a memory.

FIG. 2 illustrates an example of an authorized print cartridge 200 that represents a type of print cartridge that may be supplied by the supplier entity 114 (FIG. 1) to, for example, the user entity 112. For the discussion that follows, we will assume that this particular type of print cartridge is compatible for use in the printing device 106.

As shown in FIG. 2, the print cartridge 200 includes a housing 202 that contains a supply of toner material 204. The print cartridge 200 further includes a label 206 that further includes a non-volatile memory 208 that is in an integrated part of the print cartridge 200. In this example, the print cartridge memory 208 is permanently attached to an outer surface of the housing 202 as shown and includes web service policy data.

It is noted that in some specific implementations, for example, the print cartridge memory 208 is of a type that can be accessed over a wireless communication link. In these implementations, the print cartridge memory 208 may represent a radio frequency identification (RFID) tag, for example. In other implementations, the memory 208 may be of a type that can be accessed via a hard-wired connection.

Authorized Print Cartridge Configuration

Prior to a print cartridge of the type just illustrated being provided to a customer, the supplier entity 114 (FIG. 1) issues a cartridge credential to the cartridge and then stores this data in the print cartridge memory. In this embodiment, the cartridge credential is unique for each cartridge and includes the following:
 1. A randomly generated number; and
 2. A unique serial number assigned to the print cartridge.

Figure 3:
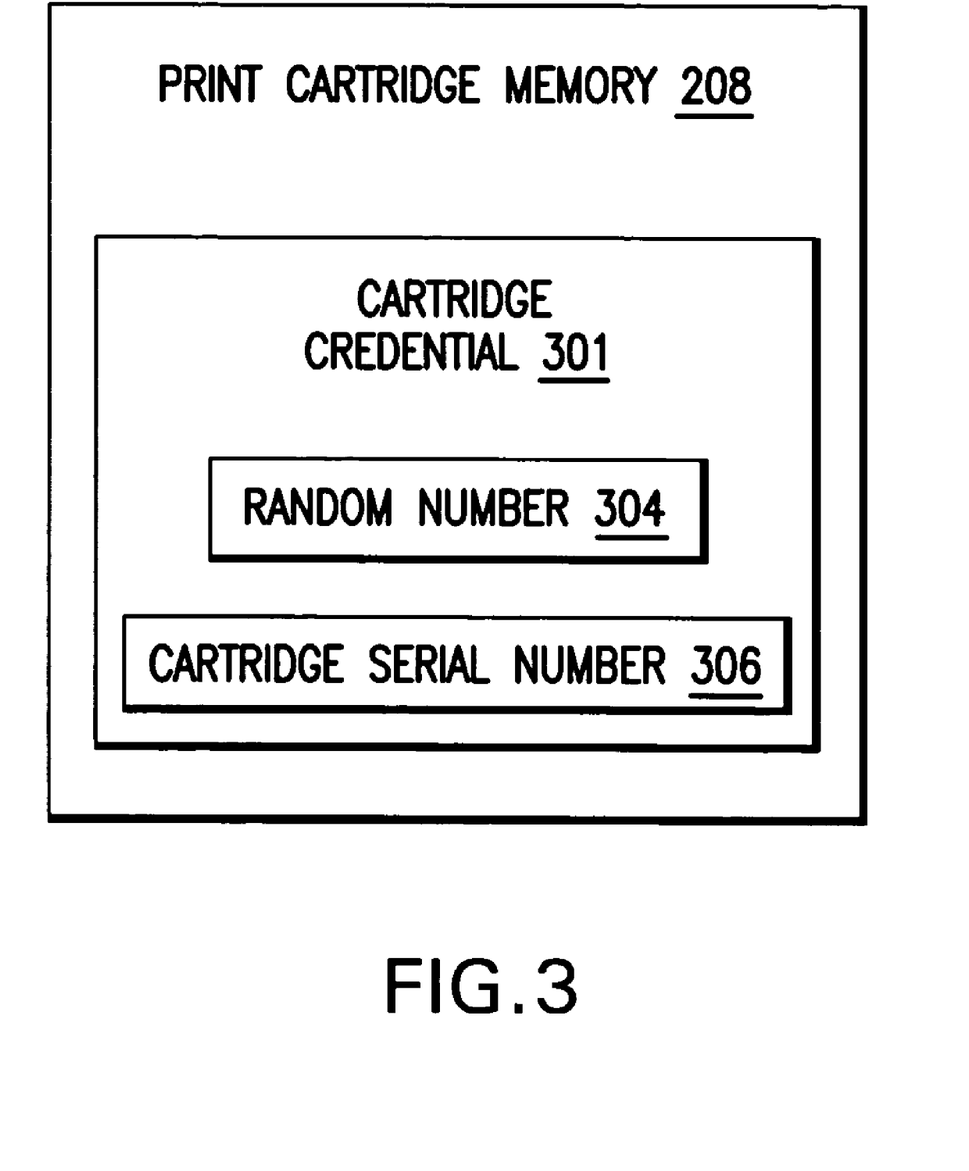
FIG. 3 illustrates the data that may be stored in a print cartridge memory, according to an embodiment of the present invention.

FIG. 3 illustrates, for example, a cartridge credential 301 that is stored in the print cartridge memory 208 (FIG. 2) prior to the supplier entity 114 providing the print cartridge 200 to a customer. As shown, the cartridge credential 301 includes a random number 302 and a unique serial number 304. The unique serial number 304 is assigned to the print cartridge 200 and can serve later to uniquely identify this particular cartridge over other print cartridges that the supplier entity 114 provides. In some specific implementations, the random number 302 and/or the print cartridge serial number 304 may be stored in the print cartridge memory 208 in an encrypted form.

It is noted for the later discussion that, in this example, the supplier entity 114 takes steps to keep a cartridge credential secret. Thus, for example, the supplier entity 114 would not publish an issued cartridge credential to un-trusted third parties.

Construction of Example Server System

Figure 4A:
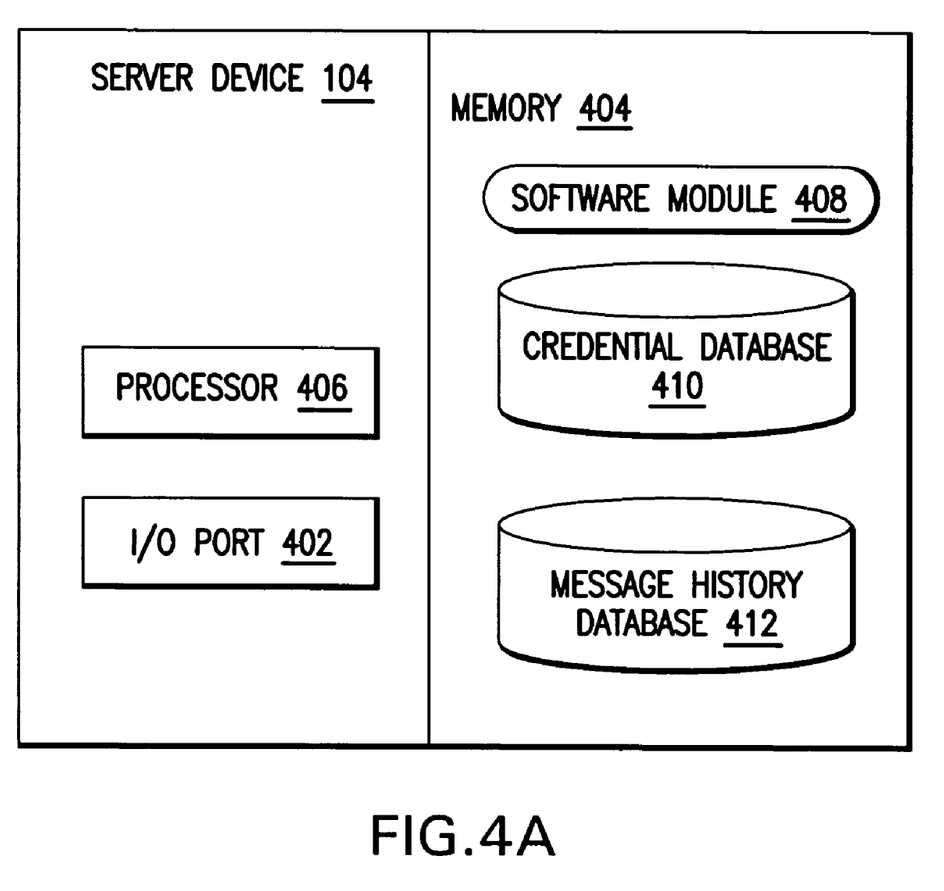
FIG. 4A is a high-level block diagram of a server system, according to an embodiment of the present invention.

FIG. 4A is a high-level block diagram illustrating one example of how the server system 104 may be constructed. As shown in FIG. 4A, the server system 104 includes an input-output (I/O) port 402, a memory 404, and a processor 406.

The I/O port 402 is generally any hardware, firmware, or gate level logic enabling the server system 104 to communicate over a network. The network could be any type of network, such as Ethernet, Token Ring or Banyan, for example. In some specific implementations, the network may interconnect with the public internet and client devices can communicate with the server system 104 over the public internet.

The memory 404 is generally any memory device or set of memory devices enabling the server system 104 to store certain electronic information. This information includes a software module 408 as well as a first set of records organized within a "cartridge credential" database 410 and a second set of records organized within a "message history" database 412.

The cartridge credential database 410 maintains a record of each cartridge credential that the supplier entity 114 (FIG. 1) has issued to a print cartridge. Thus, for example, the cartridge credential database 410 includes a record that specifies the cartridge credential 301 that was issued to the print cartridge 200 (FIG. 2). As discussed further below, this particular database enables the server system 104 to recognize a cartridge credential in a RPC message as one that has been actually issued by the supplier entity 114 to a print cartridge. A cartridge credential specified by an RPC message that is not listed in the cartridge credential database 410 is considered invalid.

Figure 4B:
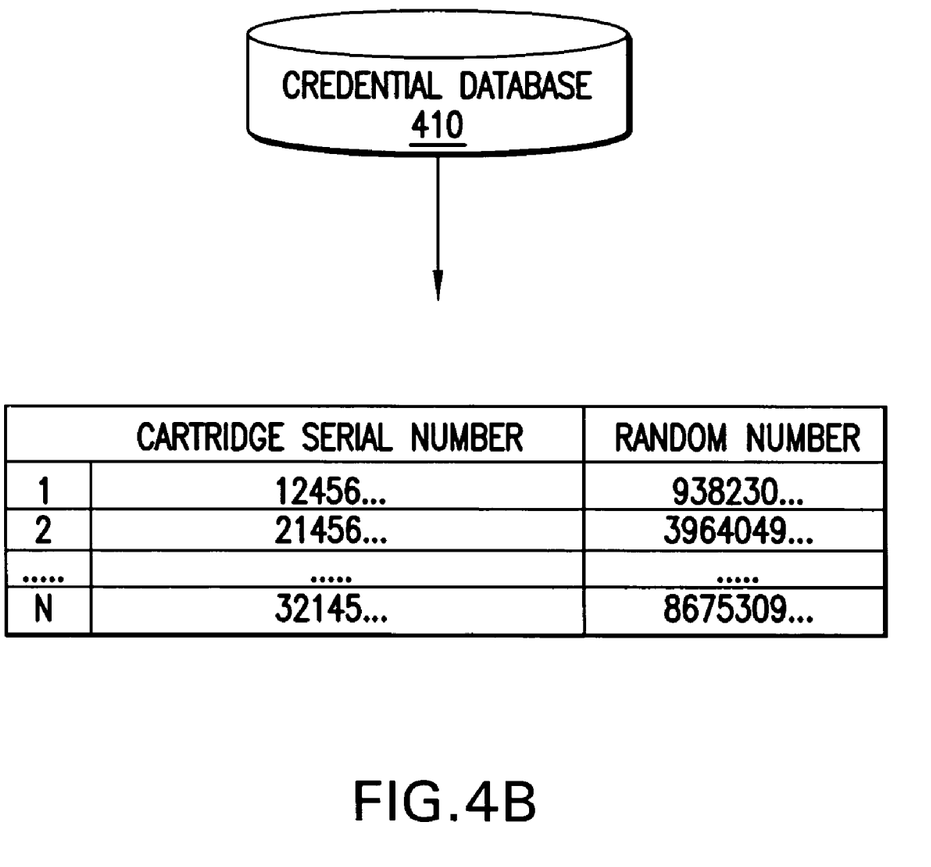
FIG. 4B illustrates an example of the records that may be present in a cartridge credential database, according to an embodiment of the present invention.

FIG. 4B illustrates an example of some of the records that may be present in the cartridge credential database 410. The message history database 412 maintains a record of the information that was included in previously received RPC messages to invoke the network service 110. As noted above, a RPC message to invoke the network service 110 (FIG. 1) may specify a cartridge credential (that includes a cartridge serial number and random number) as well as a printing device serial number. In the present embodiment, when an RPC message that includes this information is received, the server system 104 operates to parse the RPC message to identify the cartridge serial number as well as the printing device serial number included in the message. The server system 104 may then place a record in the message history database 412 that specifies the cartridge serial number and the printing device serial number.

Figure 4C:
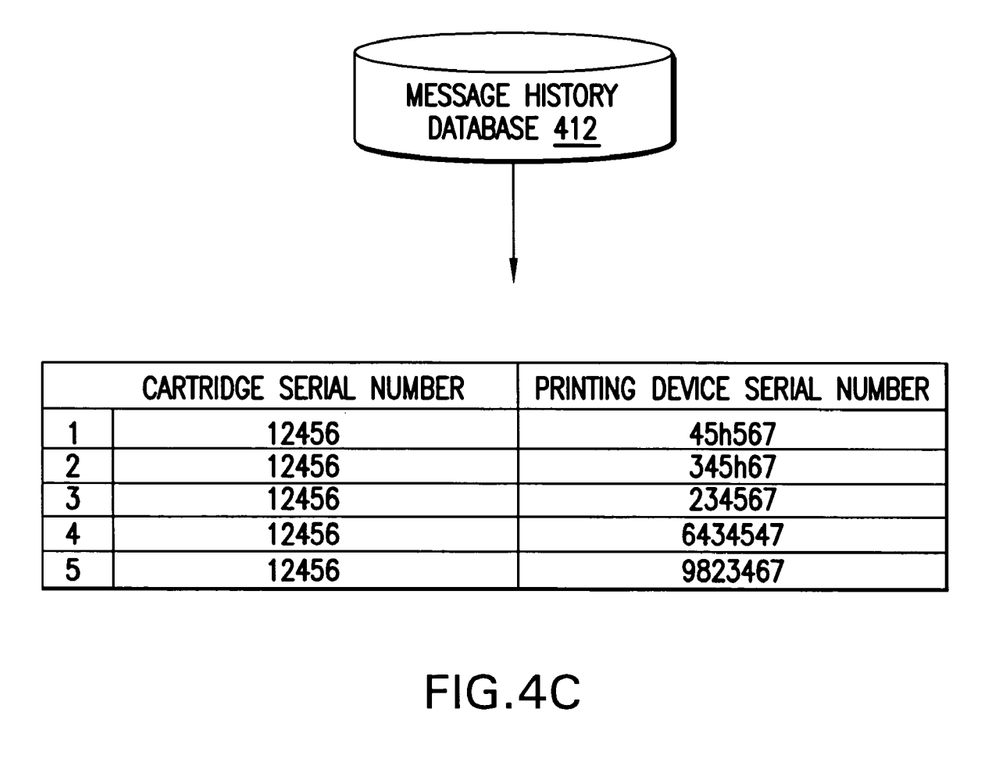
FIG. 4C illustrates an example of the records that may be present in the message history database for one particular cartridge credential, according to an embodiment of the present invention.

FIG. 4C illustrates an example of the records that may be present in the message history database 412 as a result of a particular cartridge credential being passed five different times to the server system 104. In this example, the cartridge credential includes a cartridge serial number set equal to "12456".

For the later discussion, it is noted that one purpose of the message history database 412 is to determine how many different printing devices have passed the same cartridge credential to the server system 104 (FIG. 1). The five records shown in FIG. 4C, for example, each specify a different printing device serial number. Thus, presumably, five different printing devices have passed a copy of this same credential to the server system 104.

The processor 406 (FIG. 4) is generally any processor device or set of processor devices that can execute the software module 408. The software module 408 enables the server system 104 to provide the network service 110 as well as to maintain and update the two databases.

Construction of an Example Printing Device

Figure 5:
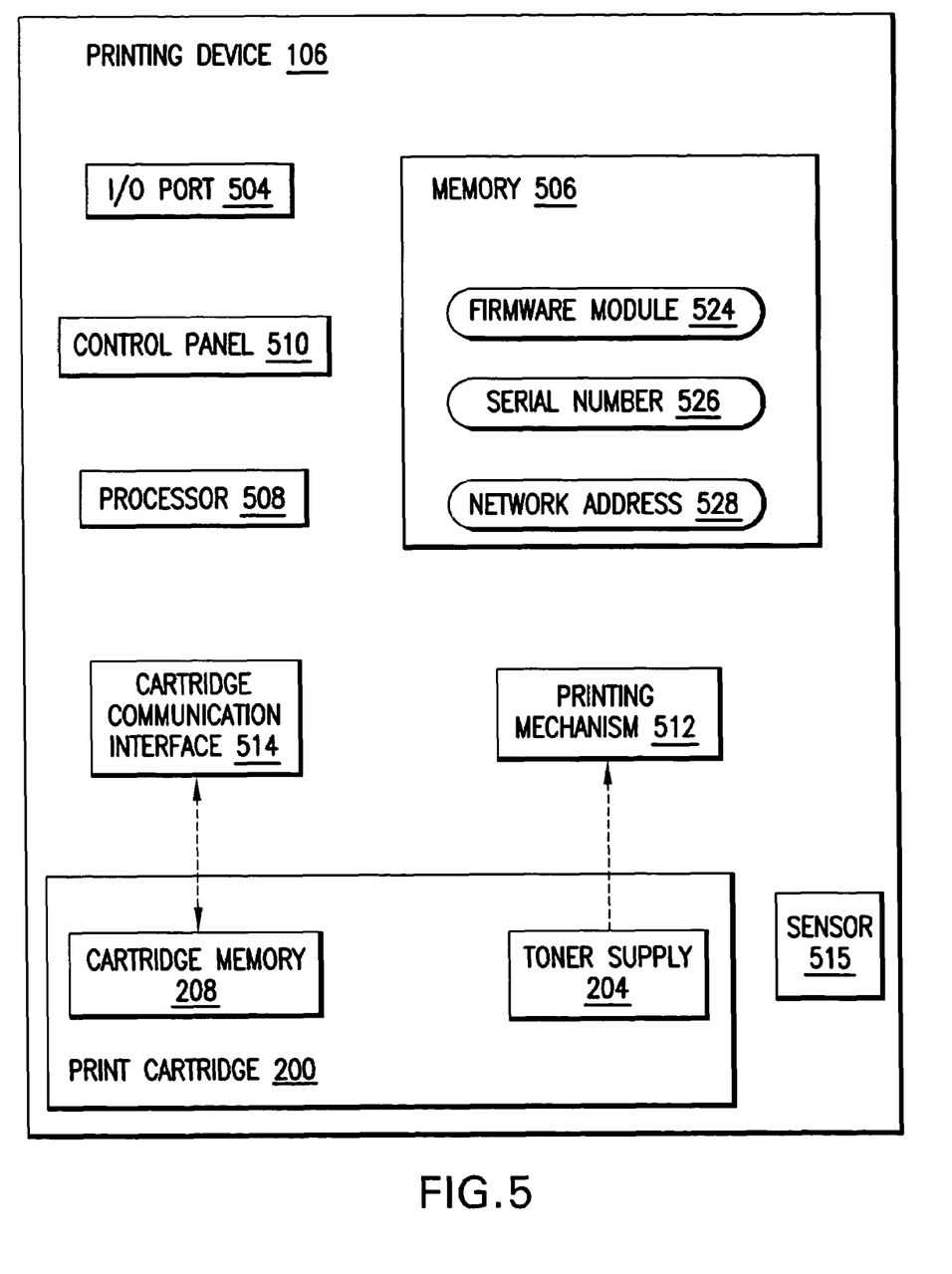
FIG. 5 is a high level block diagram of a printing device, according to an embodiment of the present invention.

FIG. 5 is a high level block diagram illustrating one example of how the printing device 106 (FIG. 1) may be constructed, in accordance with an embodiment of the invention. In FIG. 5 we assume that the supplier entity 114 has provided the authorized print cartridge 200 to the user entity 112 and that this cartridge has been installed in the printing device 106. Thus, the printing device 106 configured as shown in FIG. 5 qualifies as an "authorized printing device" and is entitled to invoke the reserved set of functions 110(*b*) of the network service 110.

As shown in FIG. 5, the printing device 106 may include an I/O port 504, a memory 506, a processor 508, a local control panel 510, a printing mechanism 512, a cartridge memory communication interface 514, and a cartridge presence sensor 515.

The I/O port 504 is generally any hardware, firmware, or gate level logic enabling the printing device 106 to communicate over a network. The network could be any type of network, such as an Ethernet, Token Ring or Banyan. In some specific implementations, the network interconnects (via a firewall) with the public internet and the printing device 106 can communicate with the server system 104 through the firewall over the public internet.

The memory 506 is generally any memory device or set of memory devices enabling the printing device 106 to store certain information. In this embodiment, for example, the memory 506 stores a firmware module 524 that the processor 508 can execute. The firmware module 524 enables the printing device 106 to perform the acts that are described below in connection with FIG. 7.

Additionally, the memory 506 also stores a unique serial number 526 and a network address 528. The serial number 526 is assigned to the printing device 106 and can serve to uniquely identify the printing device 106 over other printing devices. The network address 528 is the network address of a RPC message to invoke the network service 110. It is noted that in some implementations the printing device serial number 526 and/or the network address 528 may be initially stored in the memory 506 by the manufacturer of the printing device 106. It is further noted that in implementations wherein the communication link 108 is the Public Internet, the network address 528 may represent a Public Internet address.

It is to be understood that processor 508 can be any suitable hardware/software device that is capable of processing data, according to a set of instructions associated with the device.

The local control panel 510 provides a user interface to the printing device 106. The local control panel 510 may include one or more displays for displaying information and selectable options for controlling the operation of the printing device 106. Additionally, the local control panel 510 may provide one or more mechanisms (e.g., user input keys) for allowing a walk-up user to select these options.

The printing mechanism 512 enables the printing device 106 to controllably place marks on a print media. As previously noted, in this embodiment, the printing device 104 is a laser printer. The printing mechanism 512 may therefore include a photoconductor and an exposure system for controllably exposing the photoconductor so as to create a latent image. During printing, the printing mechanism 512 uses toner (that can be obtained from the installed print cartridge 200 (FIG. 2)) to develop the latent image. The developed latent image may then be transferred (directly or indirectly) to a print media so as to generate printed output.

The cartridge memory communication interface 514 enables the printing device 106 to interface with the print cartridge memory 208 when the print cartridge 200 is installed. In implementations wherein the cartridge memory 208 can be accessed wirelessly, the cartridge communication interface 514 may include circuitry that enables the printing device to access the print cartridge memory 208 over a wireless communication link. If, however, the cartridge memory 208 is accessible via a hard-wired connection, the cartridge communication interface 514 may include circuitry that temporarily establishes a hard-wired connection with the print cartridge memory 208 while the print cartridge 200 is installed in the printing device 106.

The cartridge presence sensor 515 enables the printing device 106 to detect when a print cartridge is installed in the printing device 106. Thus, for example, the cartridge presence sensor 515 may represent an optical, electromechanical and/or a mechanical switch that signals the processor 508 when a print cartridge is installed in the printing device 106.

Operation of Server System

Figure 6:
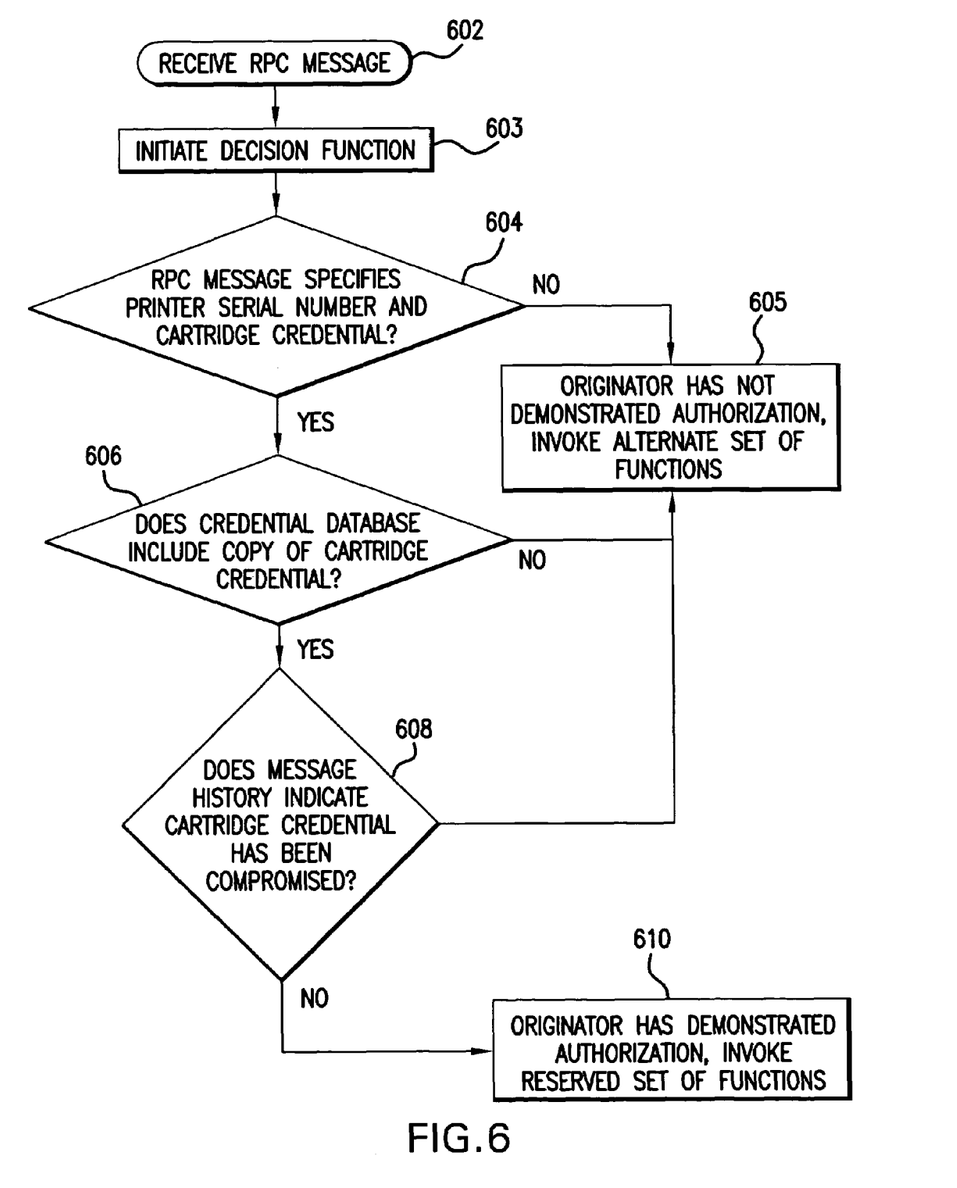
FIG. 6 illustrates one specific example of how the server system may operate upon receiving an RPC message to invoke a network service, according to an embodiment of the present invention.

FIG. 6 illustrates one specific example of how the server system 104 may operate upon receiving a RPC message to invoke the network service 110. Referring now to FIG. 6, we assume the server system 104 (FIG. 1) receives a RPC message to invoke the network service 110 at step 602.

Upon receiving the RPC message, the server system 104 proceeds to perform the decision function 110(a) in order to decide whether to respond to the message by invoking the reserved set of functions 110(b) or the alternate set of functions 110(c) (step 603). As previously noted, this decision is based upon whether the information included in the RPC message demonstrates, to an acceptable degree of certainty, that the originator of the current RPC message is an authorized printing device. Steps 604-610 illustrate the operation of the server device 104 to perform the decision function 110(a).

At step 604, the server system 104 determines if the current RPC message specifies a printing device serial number and a cartridge credential. If any of this information is absent, then the alternate set of functions 110(c) is invoked as the information included in the RPC message does not demonstrate that the originator of the RPC message is an authorized printing device (step 605).

If, however, the RPC message does specify a printing device serial number and a cartridge credential, the server system 104 proceeds to decision step 606.

At step 606, the server system 104 determines if the database 410 (FIG. 4) includes a record of the cartridge credential that is specified by the current RPC message (step 606). If no such record exists, then the alternate set of functions 110(c) is invoked (step 605) as the cartridge credential is considered invalid and therefore unable to demonstrate that the originator of the RPC message is an authorized printing device (step 605)

If, however, such a record does exist, the server system 104 proceeds to decision step 608.

At step 608, the server system 104 uses the information included in the message history database 412 to detect if the current cartridge credential is being misused and/or the secrecy of the credential has been compromised in some way. If such a condition is detected, the alternate set of functions 110(c) is invoked (step 605) as the ability of cartridge credential to demonstrate that the originator of the RPC message is an authorized printing device is not considered trustworthy.

If, however, such a condition is not detected then the information specified by the RPC message is deemed to have demonstrated that the originator is indeed an authorized printing device. Accordingly, the server system 104 proceeds to invoke the reserved set of functions 110(b) in response to the RPC message (step 610).

Before we discuss one specific way the server system 104 could perform step 608, it is instructive to first consider the following scenario. Suppose a third party has obtained a copy of a valid cartridge credential. Suppose further that the party is widely distributing print cartridges and that each of these cartridges include a copy of the now compromised credential.

As noted above, these print cartridges are considered "unauthorized print cartridge" as the supplier entity 114 has not issued each of these cartridges their own credential. This is true even if each of the unauthorized print cartridges is an exact replica of an authorized print cartridge. Furthermore, the printing devices that use these print cartridges are considered unauthorized printing devices and are therefore not entitled to invoke the reserved set of functions 110(b).

Under this scenario, there may be a significant number of printing devices in the field that are actually unauthorized printing devices, but nevertheless are able to pass the same compromised cartridge credential to the server system 104. Some or all of these unauthorized printing devices may have attempted to invoke the network service 110 in the past by sending to the server system a RPC message that specified their own serial number and a copy of the compromised cartridge credential.

Step 608 may be performed to detect this scenario and may be based upon an assumption that it would be unlikely an authorized print cartridge would be installed in more than "N_thresh" different printing devices. Thus, if the message history database 412 indicates that more than "N_thresh" printing devices have passed the same cartridge credential, this would be an indication that the cartridge credential has been compromised.

Accordingly, the server system 104 may operate at step 608 to access the message history database 412 to determine if more than "N_thresh" different printers have passed the same cartridge credential as that specified by the current RPC message. If so, then the cartridge credential is considered untrustworthy and the server system 104 proceeds to invoke the alternate set of functions 605. If not, then the server system 104 may then proceed to invoke the reserved set of functions 110(b).

Reserved Functions 110(b) and Alternate Functions 110(c)

It is noted that the reserved set of functions 110(b) could represent any set of computer implemented functions that the supplier entity 114 wishes to provide to its customers in return for a purchase of an authorized print cartridge. These functions, therefore, could represent a set of computer implemented functions that a user of a printing device and/or a system administrator of a printing device could find useful.

In the present embodiment, for example, the server system 104 performs the reserved set of functions 110 by transmitting a first reply back to the originator of the RPC message (which is presumed to be an authorized printing device). The first reply directs the authorized printing device to display a first message that indicates the authorized print cartridge presently installed in the printing device originated from the supplier entity 114.

Additionally, in the present embodiment, the alternate set of functions 110(c) is performed by the server system 104 transmitting a second reply back to the originator of the RPC message. The second reply may direct the originator of the message to display a message that the RPC message failed.

Operation of a Printing Device to Invoke Network Service

Figure 7:
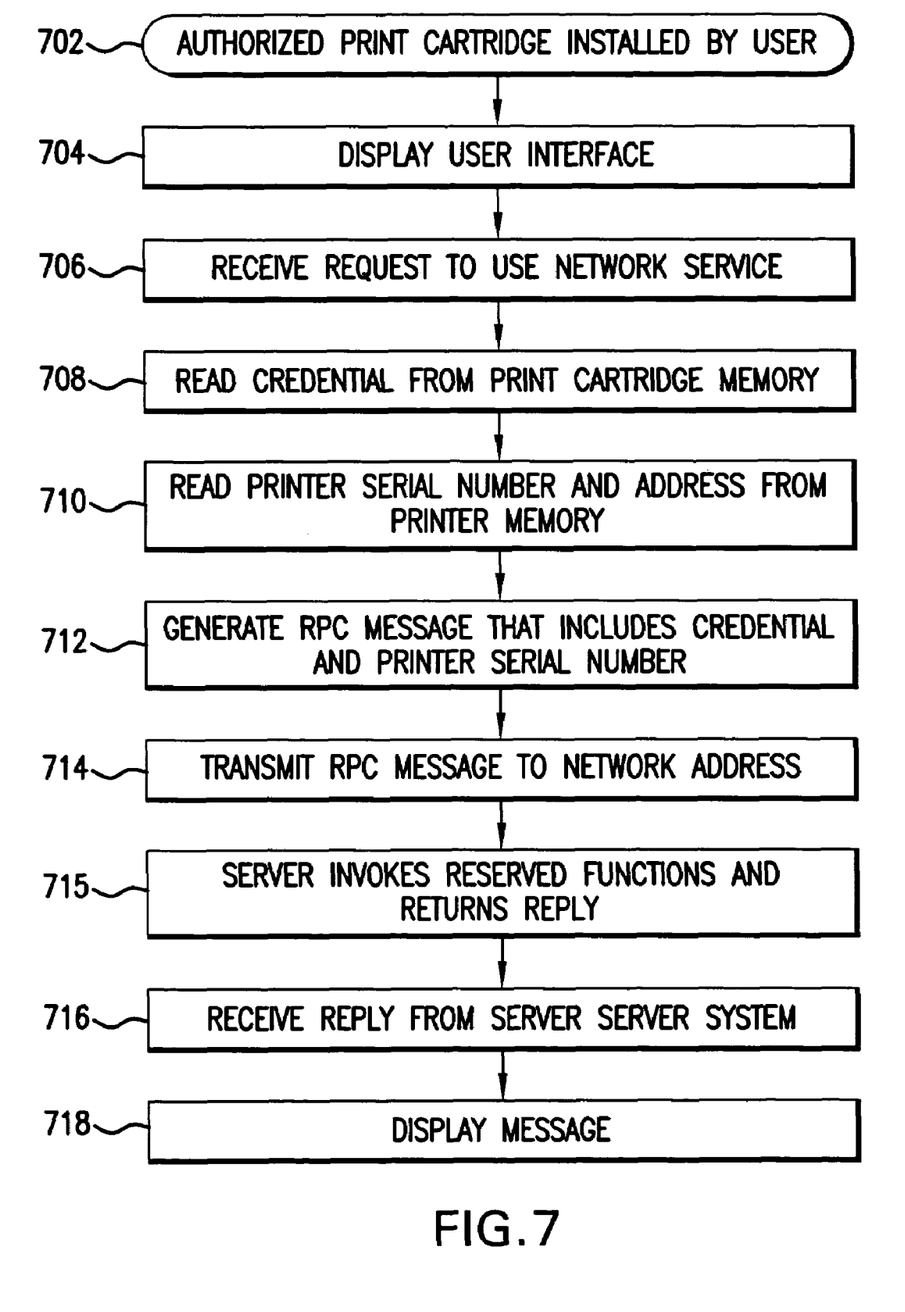
FIG. 7 is a flow diagram illustrating one specific example of how a printing device may operate to invoke a network service, according to an embodiment of the present invention.

FIG. 7 is a flow diagram illustrating one specific example of how an authorized printing device may operate to invoke the network service 110 (FIG. 1). Referring now to FIG. 7, we assume that the user entity 112 obtains the authorized print cartridge 200 (FIG. 2) from the supplier entity 114 and then installs the cartridge into the printing device 106 (step 702). Thus, in this manner, the printing device 106 is "converted" into an authorized printing device.

At step 704, according to one embodiment, the printing device 106 displays a user interface on the control panel 510

(FIG. 5). This may be in a response to the printing device detecting the installation of the print cartridge, for example. The user interface may provide information that describes aspects of the network service and may include one or more selectable options for allowing a user to submit a request to invoke the network service 110.

At step 706, the printing device 106 receives a request from the user to access the network service 110. In response to this request, the printing device 106 proceeds to perform steps 708-714.

At step 708, the printing device 106 reads the cartridge credential 301 (FIG. 3) stored in the print cartridge memory 208 (FIG. 2).

At step 710, the printing device 106 reads the printing device serial number 526 and the network address 528 from the printing device memory 506.

At step 712, the printing device 106 generates a RPC message to invoke the network service 110. The message includes the cartridge credential 301 and the printing device serial number 526.

At step 714, the printing device 106 transmits the RPC message to the network address 528.

At step 715, the server system 104 receives the RPC message and concludes that the information included in the message demonstrates that the originator of the message is an authorized printing device. In response to this condition, the server system 104 invokes the reserved set of functions 110 (*b*). This results in the server system 104 transmitting a reply back to the printing device 106. The reply directs the printing device 106 to display a message that informs the user that the print cartridge presently being used by the printing device originated from the supplier entity 114.

At step 716, the printing device 106 receives the reply from the server device 104.

At step 718, the printing device 106 responds to the reply by displaying on the control panel 510 the message just described.

A Method of Altering Web Service Access Through a Replaceable Component

It must be kept in mind that it is probably not recommended that the web service access be turned on by default. However, this may not be true in the future. It is well known that SKUs are very long lived. Therefore, having replaceable component data that can enable/disable web service access allows printing device manufacturers to alter the behavior long after the printing device has shipped. When the user installs a new replaceable component, the web service is simply enabled/disabled by default.

Figure 8:
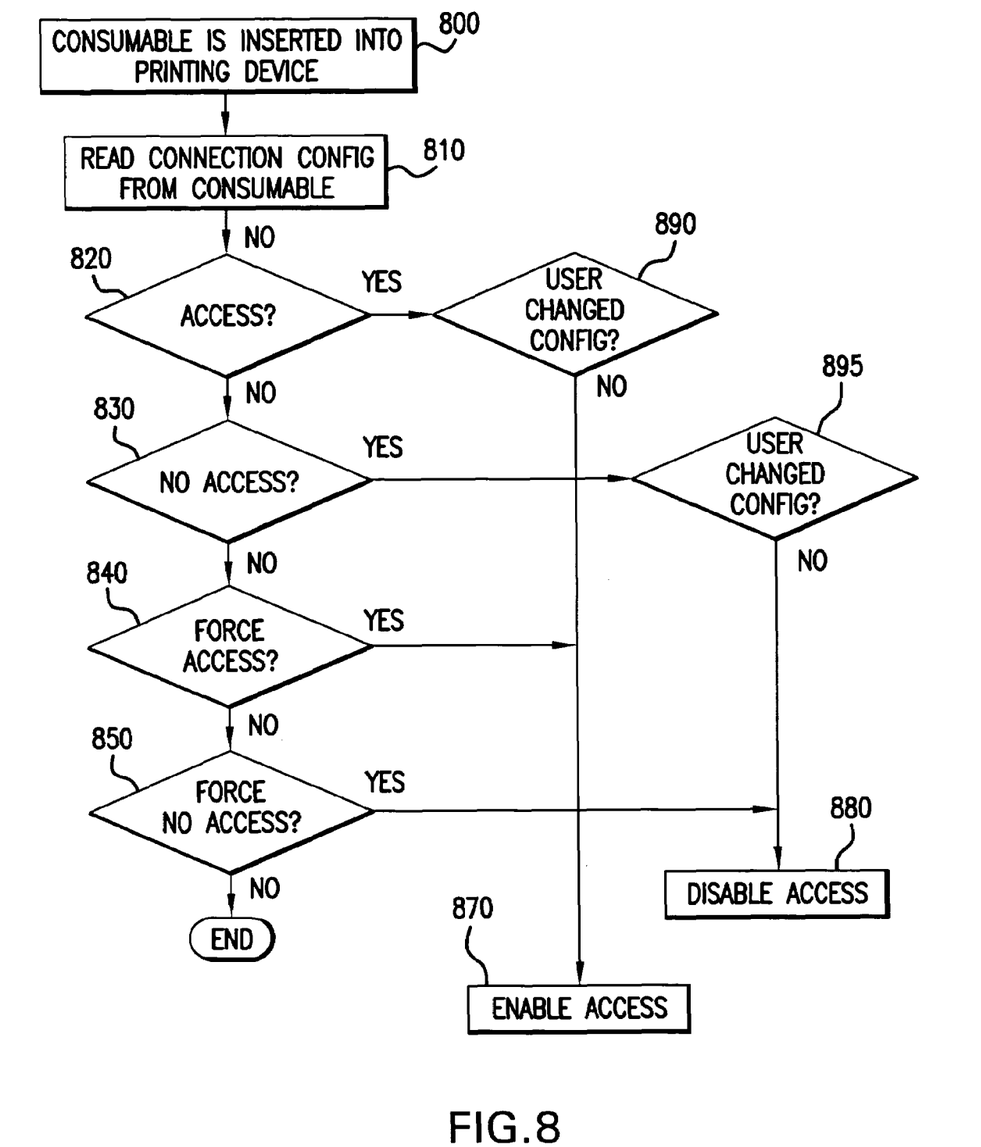
FIG. 8 is a flow diagram illustrating a method of altering web service access through a replaceable component, according to another embodiment of the present invention.

With this in mind, before the authorized printing device invokes the network service in FIG. 7, the method of FIG. 7 can be used to alter web service access through a replaceable component, such as a consumable as shown in FIG. 8. FIG. 8 illustrates a method 800 for altering web service access. Method 800 includes, among other things, the step of inserting a replaceable component, such as a consumable into a printing device 106 (FIG. 1) (step 802). The replaceable component memory is then read to determine the access policy for the printing device (step 810).

A determination is first made as to whether or not the replaceable component has been pre-set to grant access to the user to alter web service access (step 820). If the replaceable component has been pre-set to allow the user to alter web service access, it is then determined if the user has changed the access setting to not allow web service access (step 890). If there is no change to access setting, accessed is enabled (step 870).

If it is determined that the replaceable component has been pre-set with a policy to prevent web service access (step 830), then it is determined if the user has changed the setting (step 895). If the user has not changed the setting, then the access is disabled (step 880).

It should be kept in mind that if the enhanced printing through web service succeeds in the market, the printing device manufacturer may wish to always have web service access enabled. This could be difficult if the user has disabled the web service capability in their printing device. Consequently, the printing device manufacturer may want to force the web service capability to be on. In this case, it is then determined if the replaceable component has been pre-set with a policy to force the device to access web services (step 840). If so, then device access to web services is enabled (step 870).

However, if the enhanced printing through web service fails in the market, the printing device manufacturer may wish to de-invest. This could be difficult if the user has enabled the web service capability in their printing device. Consequently, the printing device manufacturer may want to force the web service capability to be off. Consequently, it is determined that the replaceable component has been pre-set with a policy to force the device not to have web service access (step 850). If so, then the access is disabled (step 880).

It is further noted that the present invention may be embodied in the form of a "computer-readable medium". As used herein, the phrase "computer readable medium" can refer to any medium that can contain, store or propagate computer executable instructions. Thus, in this document, the phrase "computer-readable medium" may refer to a medium such as an optical storage device (e.g., a CD ROM) or a magnetic storage device (e.g., a magnetic tape). The phrase "computer-readable medium" may also refer to signals that are used to propagate the computer executable instructions over a network or a network system, such as the Public Internet.

Thus, a memory component (e.g., the server memory 404 or the printing device memory 506) that stores computer executable instructions (e.g., the server software module 408 or the firmware module 524) may represent an embodiment of the invention. Furthermore, signals used to propagate the firmware over a communication link (e.g. an intranet, Public Internet, etc) may also represent an embodiment of the invention.

It is to be understood that the flowchart of FIGS. 6-8 show the architecture, functionality, and operation of one implementation of the present invention. If embodied in software, each block may represent a module, segment, or portion of code that comprises one or more executable instructions to implement the specified logical function(s). If embodied in hardware, each block may represent a circuit or a number of interconnected circuits to implement the specified logical function(s).

Also, the present invention can be embodied in any computer-readable medium for use by or in connection with an instruction-execution system, apparatus or device such as a computer/processor based system, processor-containing system or other system that can fetch the instructions from the instruction-execution system, apparatus or device, and execute the instructions contained therein. In the context of this disclosure, a "computer-readable medium" can be any means that can store, communicate, propagate or transport a program for use by or in connection with the instruction-execution system, apparatus or device. The computer-readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc. It is to be understood that the computer-readable medium could even be paper or another suitable medium upon which the program is printed, as the program can be electronically captured, via, for instance, optical scanning of the paper or other medium, then compiled, interpreted or otherwise processed in a single manner, if necessary, and then stored in a computer memory.

Those skilled in the art will understand that various embodiment of the present invention can be implemented in hardware, software, firmware or combinations thereof. Separate embodiments of the present invention can be implemented using a combination of hardware and software or firmware that is stored in memory and executed by a suitable instruction-execution system. If implemented solely in hardware, as in an alternative embodiment, the present invention can be separately implemented with any or a combination of technologies which are well known in the art (for example, discrete-logic circuits, application-specific integrated circuits (ASICs), programmable-gate arrays (PGAs), field-programmable gate arrays (FPGAs), and/or other later developed technologies. In preferred embodiments, the present invention can be implemented in a combination of software and data executed and stored under the control of a computing device.

It will be well understood by one having ordinary skill in the art, after having become familiar with the teachings of the present invention, that software applications may be written in a number of programming languages now known or later developed.

Although the flowchart of FIGS. 6-8 show a specific order of execution, the order of execution may differ from that which is depicted. For example, the order of execution of two or more blocks may be scrambled relative to the order shown. Also, two or more blocks shown in succession in the Figures may be executed concurrently or with partial concurrence. All such variations are within the scope of the present invention.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A method for altering web service access through a replaceable component comprising the steps of:
    inserting a replaceable component into a printing device; and
    reading the replaceable component to determine if the component includes a setting that is used to alter web service access;
    reading a credential of the replaceable component;
    transmitting the credential to a server; and
    determining if a user has changed the setting.

2. The method, as in claim 1, wherein the method is further comprised of the step of:
    enabling web service access, if the user has not changed the setting.

3. The method, as in claim 1, wherein the replaceable component is further comprised of:
    a consumable.

4. The method, as in claim 1, wherein the reading step is further comprised of the step of:
    reading a data source located substantially on the component.

5. The method, as in claim 4, wherein the data source is further comprised of:
    a memory chip.

6. The method, as in claim 4, wherein the data source is further comprised of:
    a bar code.

7. The method, as in claim 4, wherein the data source is further comprised of:
    a RFID tag.

8. The method of claim 1 further comprising determining a number of different printing devices from which a same credential has been sent to the server.

9. The method of claim 8 further comprising denying access to web service if the determined number of different printing devices exceeds a predetermined threshold.

10. A method for preventing web service access through a replaceable component comprising the steps of:
    inserting a replaceable component into a printing device; and
    reading the replaceable component to determine if the component includes a setting that is used to prevent web service access; and
    determining if a user has changed the setting.

11. The method, as in claim 10, wherein the method is further comprised of the step of:
    preventing web service access, if the user has not changed the setting.

12. The method, as in claim 10, wherein the replaceable component is further comprised of:
    a consumable.

13. The method, as in claim 10, wherein the reading step is further comprised of the step of:
    reading a data source located substantially on the component.

14. The method, as in claim 13, wherein the data source is further comprised of:
    a memory chip.

15. The method, as in claim 13, wherein the data source is further comprised of:
    a bar code.

16. The method, as in claim 13, wherein the data source is further comprised of:
    a RFID tag.

17. A method for forcing web service access through a replaceable component comprising the steps of:
    inserting a replaceable component into a printing device; and
    reading the replaceable component to determine if the component includes a setting that is used to force web service access;
    reading a credential of the replaceable component; and
    transmitting the credential to a server.

18. The method, as in claim 17, wherein the replaceable component is further comprised of:
    a consumable.

19. The method, as in claim 17, wherein the reading step is further comprised of the step of:
    reading a data source located substantially on the component.

20. The method, as in claim 17, wherein the data source is further comprised of:
    a memory chip.

21. The method, as in claim 17, wherein the data source is further comprised of:
    a bar code.

22. The method, as in claim 17, wherein the data source is further comprised of:
a RFID tag.

23. A method for forcing a replaceable component not to have web service access through the replaceable component comprising the steps of:
inserting a replaceable component into a printing device; and
reading the replaceable component to determine if the component includes a setting that is used for forcing a replaceable component not to have web service access;
reading a credential of the replaceable component; and
transmitting the credential to a server.

24. The method, as in claim 23, wherein the replaceable component is further comprised of:
a consumable.

25. The method, as in claim 23, wherein the reading step is further comprised of the step of:
reading a data source located substantially on the component.

26. The method, as in claim 25, wherein the data source is further comprised of:
a memory chip.

27. The method, as in claim 25, wherein the data source is further comprised of:
a bar code.

28. The method, as in claim 25, wherein the data source is further comprised of:
a RFID tag.

29. The method of claim 23 further comprising determining a number of different printing devices from which a same credential has been sent to the server.

30. The method of claim 29 further comprising denying access to web service if the determined number of different printing devices exceeds a predetermined threshold.

31. A program storage medium readable by a computer, tangibly embodying a program of instructions executable by the computer to perform a method for altering web service access through a replaceable component comprising the steps of: inserting a replaceable component into a printing device; and
reading the replaceable component to determine if the component includes a setting that is used to alter web service access;
reading a credential of the replaceable component;
transmitting the credential to a server; and determining if a user has changed the setting.

32. The method, as in claim 31, wherein the replaceable component is further comprised of:
a consumable.

33. The method, as in claim 31, wherein the reading step is further comprised of the step of:
reading a data source located substantially on the component.

34. The method, as in claim 33, wherein the data source is further comprised of:
a memory chip.

35. The method, as in claim 33, wherein the data source is further comprised of:
a bar code.

36. The method, as in claim 33, wherein the data source is further comprised of:
a RFID tag.

37. The method, as in claim 31, wherein the method is further comprised of the step of:
enabling web service access, if the user has not changed the setting.

38. A method for preventing web service access through a replaceable component comprising the steps of:
inserting a replaceable component into a printing device; and
reading the replaceable component to determine if the component includes a setting that is used to prevent web service access; and
determining if a user has changed the setting.

39. The method, as in claim 38, wherein the method is further comprised of the step of:
preventing web service access, if the user has not changed the setting.

40. The method, as in claim 38, wherein the replaceable component is further comprised of:
a consumable.

41. The method, as in claim 38, wherein the reading step is further comprised of the step of:
reading a data source located substantially on the component.

42. The method, as in claim 41, wherein the data source is further comprised of:
a memory chip.

43. The method, as in claim 41, wherein the data source is further comprised of:
a bar code.

44. The method, as in claim 41, wherein the data source is further comprised of:
a RFID tag.

45. A method for forcing web service access through a replaceable component comprising the steps of:
inserting a replaceable component into a printing device; and
reading the replaceable component to determine if the component includes a setting that is used to force web service access;
reading a credential of the replaceable component; and
transmitting the credential to a server.

46. The method, as in claim 45, wherein the replaceable component is further comprised of:
a consumable.

47. The method, as in claim 45, wherein the reading step is further comprised of the step of:
reading a data source located substantially on the component.

48. The method, as in claim 47, wherein the data source is further comprised of:
a memory chip.

49. The method, as in claim 47, wherein the data source is further comprised of:
a bar code.

50. The method, as in claim 47, wherein the data source is further comprised of:
a RFID tag.

51. A method for forcing a replaceable component not to have web service access through the replaceable component comprising the steps of:
inserting a replaceable component into a printing device;
reading the replaceable component to determine if the component includes a setting that is used for forcing a replaceable component not to have web service access;
reading a credential of the replaceable component; and
transmitting the credential to a server.

52. The method, as in claim 51, wherein the replaceable component is further comprised of:
a consumable.

53. The method, as in claim 51, wherein the reading step is further comprised of the step of:

reading a data source located substantially on the component.

54. The method, as in claim 53, wherein the data source is further comprised of:

a memory chip.

55. The method, as in claim 53, wherein the data source is further comprised of:

a bar code.

56. The method, as in claim 53, wherein the data source is further comprised of:

a RFID tag.

57. A system for altering web service access through a replaceable component comprising:

means for inserting a replaceable component into a printing device;

means for reading the replaceable component to determine if the component includes a setting that is used to alter web service access; and means for determining if a user has changed the setting.

58. The system, as in claim 57, wherein the system is further comprised of: means for enabling web service access, if the user has not changed the setting.

59. The system, as in claim 57, wherein the replaceable component is further comprised of:

a consumable.

60. The system, as in claim 57, wherein the reading means is further comprised of:

means for reading a data source located substantially on the component.

61. The system, as in claim 60, wherein the data source is further comprised of:

a memory chip.

62. The system, as in claim 60, wherein the data source is further comprised of:

a bar code.

63. The system, as in claim 60, wherein the data source is further comprised of:

a RFID tag.

64. A system for preventing web service access through a replaceable component comprising:

means for inserting a replaceable component into a printing device;

means for reading the replaceable component to determine if the component includes a setting that is used to prevent web service access; and means for determining if user has changed the setting.

65. The system, as in claim 64, wherein the system is further comprised of:

means for preventing web service access, if the user has not changed the setting.

66. The system, as in claim 64, wherein the replaceable component is further comprised of:

a consumable.

67. The system, as in claim 64, wherein the reading means is further comprised of:

means for reading a data source located substantially on the component.

68. The system, as in claim 67, wherein the data source is further comprised of:

a memory chip.

69. The system, as in claim 67, wherein the data source is further comprised of:

a bar code.

70. The system, as in claim 67, wherein the data source is further comprised of:

a RFID tag.

71. A system for forcing web service access through a replaceable component comprising:

means for inserting a replaceable component into a printing device; and means for reading the replaceable component to determine if the component includes a setting that is used to force web service access;

means for reading a credential of the replaceable component; and means for transmitting the credential to a server.

72. The system, as in claim 71, wherein the replaceable component is further comprised of:

a consumable.

73. The system, as in claim 71, wherein the reading means is further comprised of:

means for reading a data source located substantially on the component.

74. The system, as in claim 73, wherein the data source is further comprised of:

a memory chip.

75. The system, as in claim 73, wherein the data source is further comprised of:

a bar code.

76. The system, as in claim 73, wherein the data source is further comprised of:

a RFID tag.

77. A system for forcing a replaceable component not to have web service access through the replaceable component comprising:

means for inserting a replaceable component into a printing device; and means for reading the replaceable component to determine if the component includes a setting that is used for forcing a replaceable component not to have web service access;

reading a credential of the replaceable component; and transmitting the credential to a server.

78. The system, as in claim 77, wherein the replaceable component is further comprised of:

a consumable.

79. The system, as in claim 77, wherein the reading means is further comprised of:

means for reading a data source located substantially on the component.

80. The system, as in claim 79, wherein the data source is further comprised of:

a memory chip.

81. The system, as in claim 79, wherein the data source is further comprised of:

a bar code.

82. The system, as in claim 79, wherein the data source is further comprised of:

a RFID tag.

* * * * *

UNITED STATES PATENT AND TRADEMARK OFFICE
CERTIFICATE OF CORRECTION

PATENT NO. : 7,460,262 B2  Page 1 of 1
APPLICATION NO. : 10/951668
DATED : December 2, 2008
INVENTOR(S) : Shell S. Simpson It is certified that error appears in the above-identified patent and that said Letters Patent is hereby corrected as shown below:

In column 15, line 51, in Claim 64, insert -- a -- before "user".

Signed and Sealed this

Twenty-first Day of April, 2009

JOHN DOLL
*Acting Director of the United States Patent and Trademark Office*